(12) United States Patent
Son et al.

(10) Patent No.: US 10,481,034 B2
(45) Date of Patent: Nov. 19, 2019

(54) APPARATUS AND METHOD FOR DIAGNOSING ABNORMAL OPERATION OF A ROTOR

(71) Applicant: DOOSAN HEAVY INDUSTRIES & CONSTRUCTION CO., LTD., Changwon-si, Gyeongsangnam-do (KR)

(72) Inventors: Jong Duk Son, Suwon-si (KR); Eun Sung Jang, Suwon-si (KR); Gang Ju Lee, Yongin-si (KR); Seung Man Eom, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 158 days.

(21) Appl. No.: 15/348,267

(22) Filed: Nov. 10, 2016

(65) Prior Publication Data

US 2017/0131172 A1    May 11, 2017

(30) Foreign Application Priority Data

Nov. 10, 2015  (KR) .................. 10-2015-0157608

(51) Int. Cl.
*G01M 1/22*    (2006.01)
*G01H 1/00*    (2006.01)
*G01M 13/028*  (2019.01)

(52) U.S. Cl.
CPC .............. *G01M 1/22* (2013.01); *G01H 1/003* (2013.01); *G01M 13/028* (2013.01)

(58) Field of Classification Search
CPC ............ G01M 1/16; G01M 1/22; G01M 1/28; G01M 13/028; G01H 1/003

(Continued)

(56) References Cited

U.S. PATENT DOCUMENTS 2,090,803 A * 8/1937 Moore ................ G01M 1/22
                                                     315/215
4,238,960 A    12/1980 Curtis et al.
(Continued)

FOREIGN PATENT DOCUMENTS

| JP | 5834363 A | 2/1983 |
| JP | 8334405 A | 12/1996 |
| JP | 2009281839 A | 12/2009 |

OTHER PUBLICATIONS

Communication dated Mar. 16, 2017, from the European Patent Office in counterpart European Application No. 16197940.6.
(Continued)

*Primary Examiner* — Benjamin R Schmitt
(74) *Attorney, Agent, or Firm* — Invenstone Patent, LLC

(57) ABSTRACT

An apparatus for diagnosing abnormal operation of a rotor. The apparatus includes a first sensor provided around a shaft in order to detect vibration occurring while the shaft provided in a rotor axially rotates, a second sensor to generate a periodic pulse signal over time whenever the shaft rotates once, and a controller to determine an operation state of the rotor by receiving signals detected by the first and second sensors. When an aperiodic pulse signal is detected in the rotor, the controller determines a position of the rotor at which the aperiodic pulse signal is generated, and a display indicates the position of the rotor in which the aperiodic pulse signal is generated, according to information calculated by the controller.

20 Claims, 6 Drawing Sheets

(58) Field of Classification Search
USPC .................................... 73/66, 457, 460, 462
See application file for complete search history.

(56) References Cited

U.S. PATENT DOCUMENTS

| | | |
|---|---|---|
| 4,335,600 A | 6/1982 | Wu et al. |
| 6,098,022 A | 8/2000 | Sonnichsen et al. |
| 2009/0320609 A1* | 12/2009 | Xia .................. G01H 9/004 73/862.08 |
| 2013/0282335 A1 | 10/2013 | Hudson et al. |

OTHER PUBLICATIONS

An European Search Report dated Jul. 9, 2019 in connection with European Patent Application No. 16197940.6 which corresponds to the above-referenced U.S. application.

* cited by examiner

APPARATUS AND METHOD FOR DIAGNOSING ABNORMAL OPERATION OF A ROTOR

CROSS-REFERENCE TO RELATED APPLICATION

This application claims priority to Korean Patent Application No. 10-2015-0157608, filed on Nov. 10, 2015 the disclosure of which is incorporated herein by reference in its entirety.

BACKGROUND

Technical Field

Exemplary embodiments of the present disclosure relate to an apparatus and method for diagnosing abnormal operation of a rotor, capable of exactly determining the inspection period of a shaft, which rotates at a specific speed for a long time, as in a rotor or a generator using the rotor having the shaft.

Description of the Related Art

In general, a wind power generator or a generator is provided therein with a shaft which rotates at a predetermined speed, and the shaft rotates for a long time in the state in which it engages with power transmission components, such as gears for transmitting torque, rather than a single component.

When the shaft rotates for a long time, the shaft may crack due to stress concentrated on any axial position thereof, or the shaft may collide with another part due to contact with a casing disposed therearound.

Conventionally, in order to diagnose the state of the shaft used as described above, an operator primarily checks the current state of the shaft with the naked eye, and then inspect portions, which are not checked with the naked eye, using an endoscope.

If the current state of the shaft is not checked with the naked eye and using the endoscope, the operator should disassemble the shaft in order to check whether the shaft is in a normal or abnormal state through experience.

In this case, the generator may be not driven for a period of time required to check the shaft by the operator. If the operator does not check the exact defect position of the shaft, the shaft must be diagnosed and analyzed using expensive devices.

For example, vibration having a certain period typically occurs when the shaft rotates. However, when vibration having an unspecified period instead of a certain period occurs, it is difficult to exactly check the defect position of the shaft.

SUMMARY

An object of the present disclosure is to provide an apparatus and method for diagnosing abnormal operation of a rotor, capable of exactly checking the position of a rotor having a shaft, in which abnormal vibration having aperiodicity occurs.

Another object of the present disclosure is to predict an exact inspection period through the same.

Other objects and advantages of the present disclosure can be understood by the following description, and become apparent with reference to the embodiments of the present invention.

In accordance with one aspect of the present disclosure, an apparatus for diagnosing abnormal operation of a rotor includes a first sensor provided around a shaft in order to detect vibration occurring while the shaft provided in a rotor axially rotates, a second sensor to generate a periodic pulse signal over time whenever the shaft rotates once, a control unit to determine an operation state of the rotor by receiving signals detected by the first and second sensors, when an aperiodic pulse signal is detected in the rotor, the control unit determining a position of the rotor in which the aperiodic pulse signal is generated, and a display unit to display the position of the rotor in which the aperiodic pulse signal is generated, according to information calculated by the control unit.

The first sensor may be a vibration sensor, and the second sensor may be a tachometer sensor.

The first sensor may be located at a bearing mount supporting the shaft.

The second sensor may include a main body having a light emitting part to irradiate the shaft with laser, a reflector rotating together with the shaft and reflecting the laser emitted from the light emitting part to the main body, and a light receiving part provided in the main body and receiving the laser reflected from the reflector.

The second sensor may be selectively installed at one of a position facing the first sensor and a position spaced apart from the first sensor by a predetermined angle.

The display unit may be configured of a plurality of light emitting devices circumferentially arranged at regular intervals on an outer periphery of the rotor.

The display unit may be configured of a plurality of light emitting devices axially arranged at regular intervals on an outer periphery of the rotor.

A time, an interval, and an intensity, in which the aperiodic pulse signal is generated, may be displayed on the display unit.

In accordance with another aspect of the present disclosure, a method of diagnosing abnormal operation of a rotor includes detecting vibration occurring in a rotor having a shaft, determining whether the detected vibration occurs in a normal state or in an abnormal state, when the vibration occurring in the rotor is determined to be abnormal vibration in the abnormal state, determining a position at which the abnormal vibration occurs, and displaying the occurrence position of the abnormal vibration.

In the detecting vibration, periodic vibration, which repeatedly occurs while the shaft provided in the rotor rotates once, and aeperiodic vibration, which non-repetitively occurs while the shaft provided in the rotor rotates once, may be simultaneously detected.

In the determining whether the detected vibration occurs, when vibration periodically occurs while the shaft axially rotates, the vibration may be determined to occur in the normal state, and when vibration aperiodically occurs while the shaft axially rotates, the vibration may be determined to occur in the abnormal state.

In the determining whether the detected vibration occurs, when vibration periodically occurs once or many times, and is then not periodically repeated while the shaft axially rotates, the vibration may be determined to occur in the normal state.

In the determining whether the detected vibration occurs, the vibration may be determined whether to occur depending on rotation of the shaft or to be transferred to the rotor from the outside.

In the determining a position at which the abnormal vibration occurs, the position of the rotor in which the abnormal vibration occurs may be determined by converting a time, at which an aperiodic vibration signal detected between periodic vibration signals generated over time while the shaft rotates is generated, into an angle.

In the displaying the occurrence position of the abnormal vibration, when the rotor has a cylindrical shape that extends by a predetermined length in an axial direction of the shaft, the position of the rotor in which the abnormal vibration occurs may be displayed by turning on one light emitting device, corresponding to an occurrence position of aperiodic vibration, among a plurality of light emitting devices circumferentially arranged at regular intervals on a front end of the rotor.

It is to be understood that both the foregoing general description and the following detailed description are exemplary and explanatory and are intended to provide further explanation of the exemplary embodiments.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
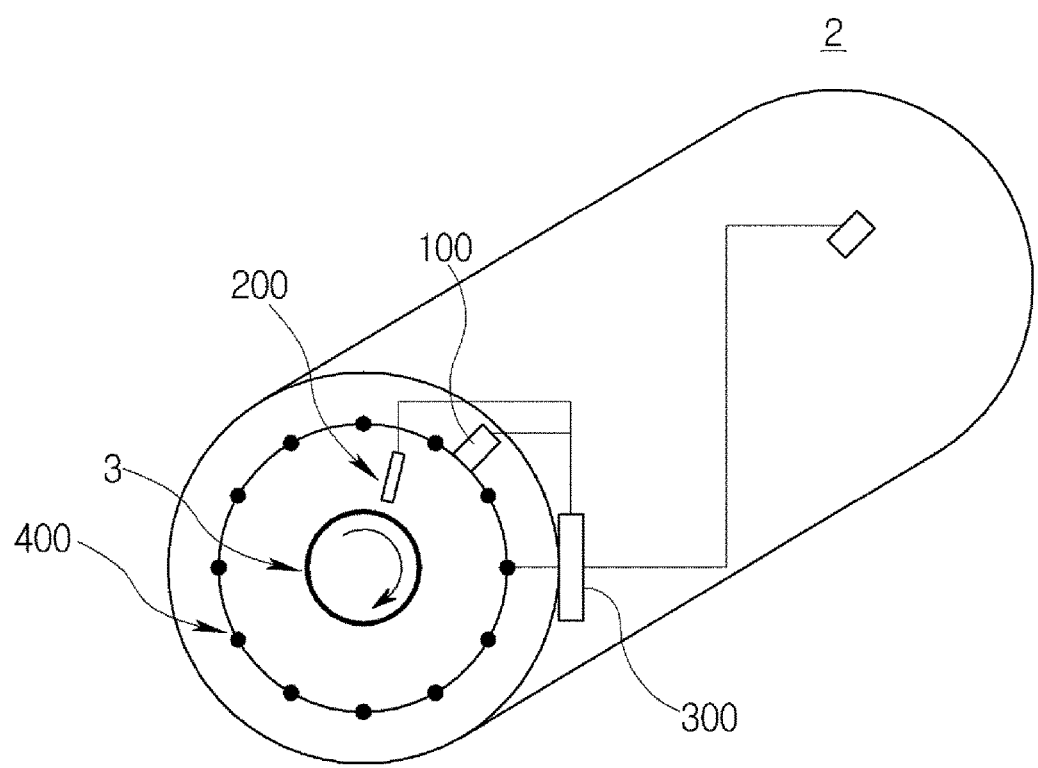
FIG. 1 is a view illustrating an apparatus for diagnosing abnormal operation of a rotor according to an exemplary embodiment of the present disclosure.

Exemplary embodiments of the present disclosure will be described below in more detail with reference to the accompanying drawings. The exemplary embodiments may have different forms and should not be construed as limited to the embodiments set forth herein. Rather, these exemplary embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

An apparatus for diagnosing abnormal operation of a rotor according to an exemplary embodiment of the present disclosure is characterized in that, in a wind power generator or a generator, which includes a rotor and a shaft and generates power by rotating the shaft, an operator checks and inspects an exact vibration occurrence position with the naked eye after detecting an impact due to vibration caused by the deformation or crack of the shaft at an unspecified position in the axial direction thereof.

Figure 2:
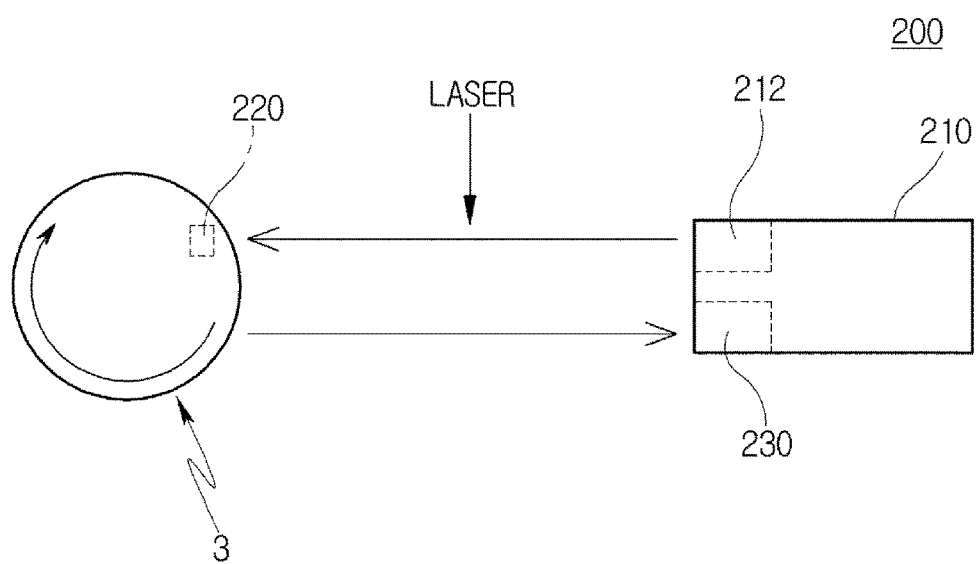
FIG. 2 is a view illustrating a vibration sensor, a tachometer sensor, and a combination thereof included in the apparatus for diagnosing abnormal operation of a rotor according to an exemplary embodiment of the present disclosure.
Figure 3:
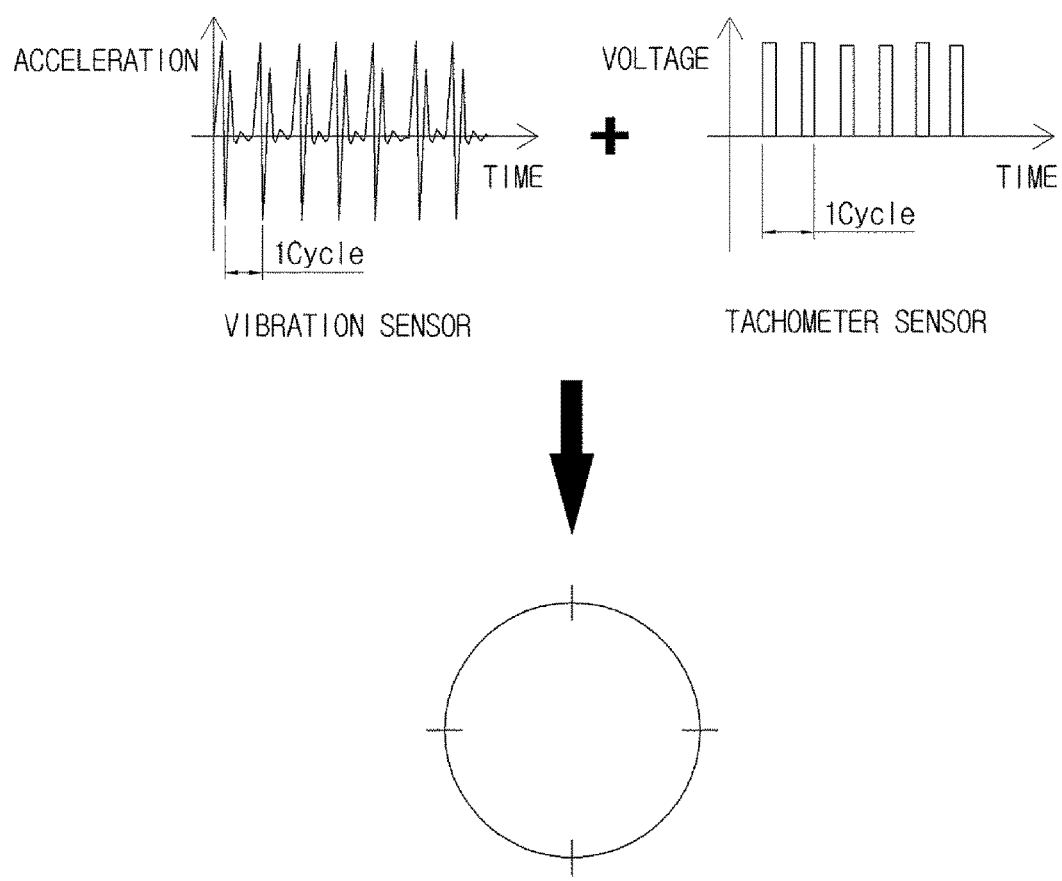
FIG. 3 is a view illustrating a state in which normal vibration occurs in the apparatus for diagnosing abnormal operation of a rotor according to an exemplary embodiment of the present disclosure.

As illustrated in FIGS. 1 to 3, one embodiment is configured such that first and second sensors 100 and 200 are installed in a rotor 2, and the signals detected by the first and second sensors 100 and 200 are input to a control unit 300 so as to be visually and recognizably displayed through a display unit 400.

The first sensor 100 is installed around a shaft 3 in order to detect vibration occurring while the shaft 3 provided in the rotor 2 axially rotates. By way of example, the first sensor 100 is a vibration sensor, and is located at a bearing mount (not shown) which supports the shaft 3.

The vibration sensor is used to detect vibration occurring while the shaft 3 axially rotates, and is located outside the shaft 3 so as not to interfere with the rotation of the shaft 3.

The vibration signal detected by the vibration sensor is indicative of an acceleration (Y-axis) over time (X-axis). As illustrated in the drawing, it can be seen that the acceleration is periodically repeated on a cycle over time. That is, the cycle and periodicity of vibration are regularly repeated over time.

The second sensor 200 is a tachometer sensor which generates a periodic pulse signal over time whenever the shaft 3 rotates once. The tachometer sensor may be installed at a position, which faces the first sensor 100 or is spaced apart from the first sensor 100 by a predetermined angle.

For reference, the second sensor 200 is illustrated to be installed at a position which is spaced apart from the first sensor 100 by a predetermined angle in the embodiment. In this case, since an angle of inclination corresponding to the predetermined angle is calibrated by the control unit 300, a pulse signal in response to one rotation of the shaft 3 may be detected with no error.

As shown in FIG. 2, the second sensor 200 includes a main body 210 having a light emitting part 212 which irradiates the shaft 3 with laser, a reflector 220 which rotates together with the shaft 3 and reflects the laser emitted from the light emitting part 212 to the main body 210, and a light receiving part 230 which is provided in the main body 210 and receives the laser reflected from the reflector 220.

In the second sensor 200, both of the light emitting part 212 and the light receiving part 230 are provided in the main body 210, and the reflector 220 is located so as to face the main body 210.

The light emitting part 212 emits laser or straight light, and the laser reflected by the reflector 200 is detected by the light receiving part 230 whenever the reflector 220 rotates once together with the shaft 3.

Accordingly, the second sensor 200 detects a pulse signal over time whenever the shaft 3 rotates once, and the pulse signal is periodically indicated in the form of bar graph, as illustrated in the drawing, when the shaft 3 is normal.

The control unit 300 receives signals detected by the first and second sensors 100 and 200 and determines the operation state of the rotor 2. When an aperiodic pulse signal is detected from the rotor 2, the control unit 300 determines the position of the rotor 2 in which the aperiodic pulse signal is generated.

The control unit 300 determines whether the vibration detected by the first sensor 100 has periodicity by analyzing data signals detected over time. When the rpm of the shaft 3 is uniformly maintained, the periodicity of vibration is uniformly maintained. In this case, the control unit 300 determines whether the signal detected in response to the rotation of the shaft 3 is a periodic signal or an aperiodic signal.

Unlike the first sensor 100, since the laser emitted from the light emitting part 212 is reflected by the reflector 220 and is then received in the light receiving part 230 in the second sensor 200, the pulse signal in the form of bar graph is periodically maintained when the shaft 3 is normal.

The control unit 300 determines whether or not the current operation of the rotor 2 is abnormal by combining signals detected by the first and second sensors 100 and 200. When signals are uniformly input to the control unit 300 from the first and second sensors 100 and 200, the control unit 300 determines that the current state of the rotor 2 is normal.

Figure 4:
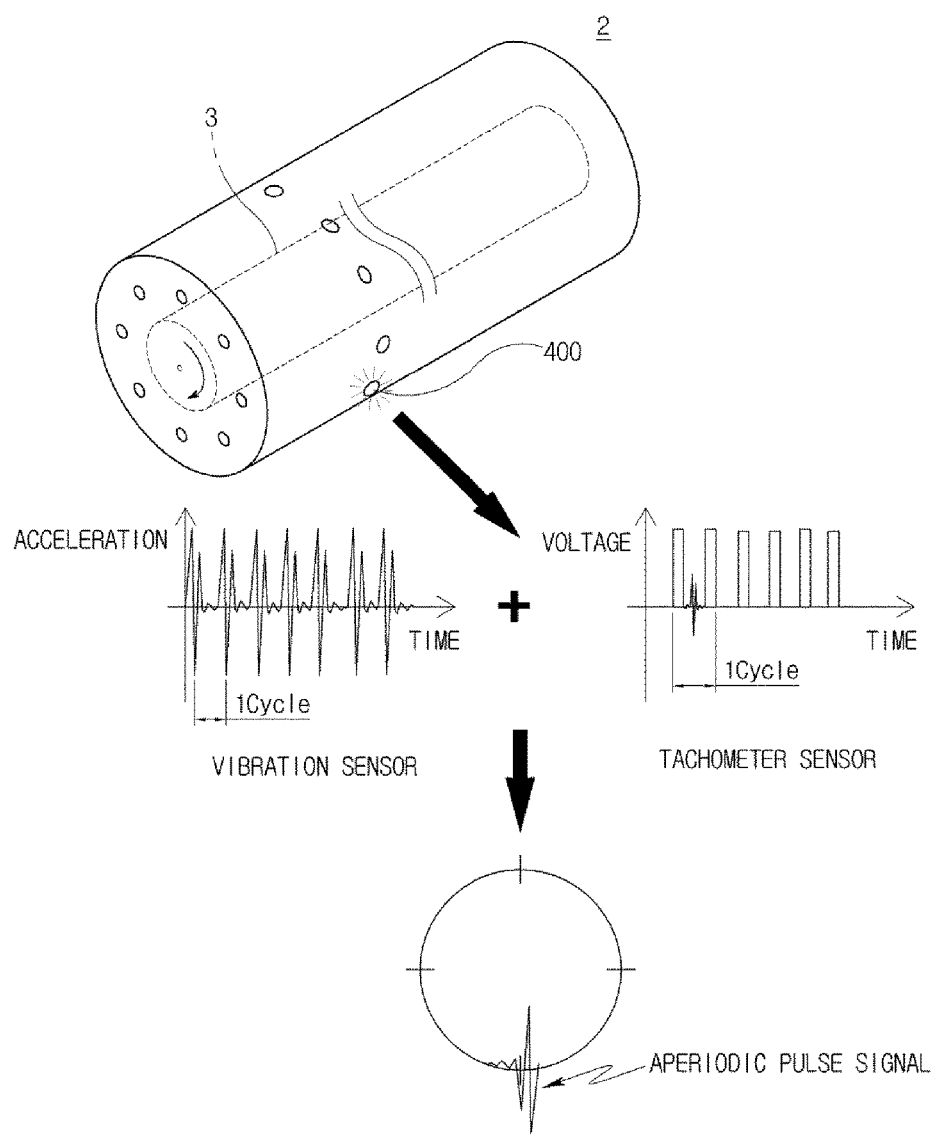
FIG. 4 is a view illustrating a state in which abnormal vibration occurs in the apparatus for diagnosing abnormal operation of a rotor according to an exemplary embodiment of the present disclosure.
Figure 5:
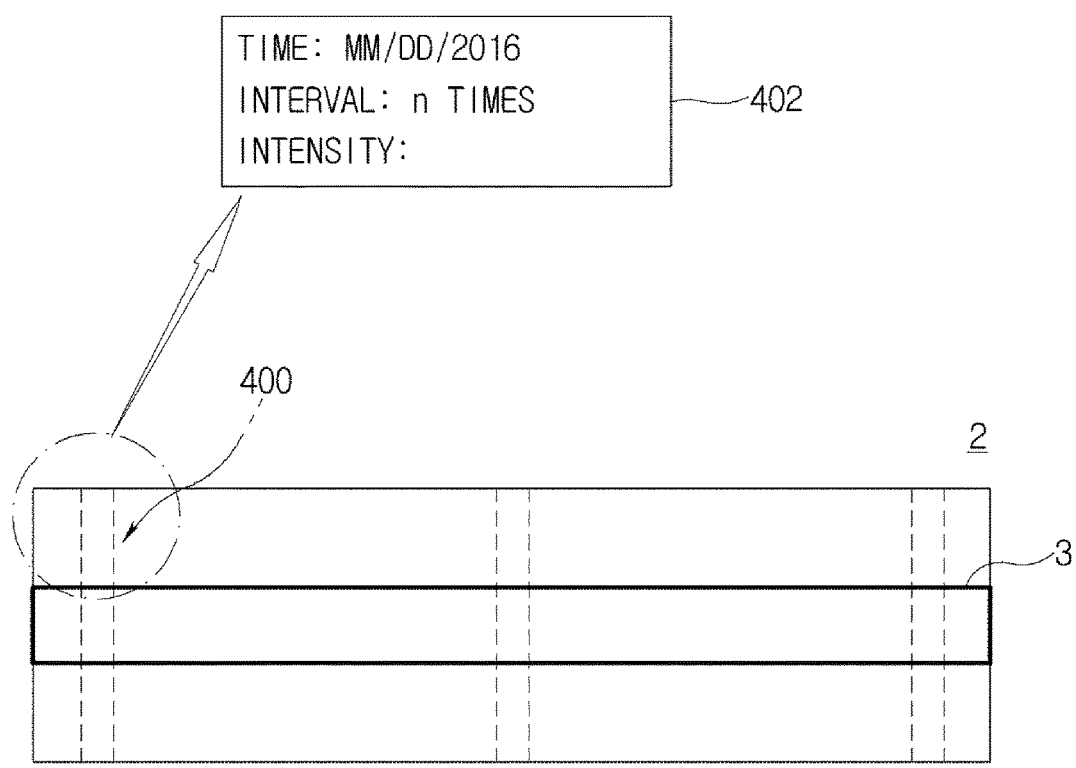
FIG. 5 is a view schematically illustrating an installation position of a display unit according to an exemplary embodiment of the present disclosure.

Referring to FIGS. 4 and 5, if the shaft 3 cracks or collides with a casing surrounding the shaft 3, the vibration signal detected by the combination of the first and second sensors 100 and 200 has an aperiodic pulse at a specific position.

In this case, the control unit 300 determines the portion of the rotor 2 in which an aperiodic pulse signal is generated by analyzing the generation position and time of the aperiodic pulse signal, in order to determine the exact position of the rotor 2 in which the aperiodic pulse signal is generated.

For example, since the periodic pulse signal detected by the second sensor 200 is generated whenever the shaft 3 rotates once, an aperiodic pulse signal is generated between the periodic pulse signals. Therefore, the position of the shaft 3 in which the aperiodic pulse signal is generated is determined by converting the time corresponding to the position into an angle of 360° and calculating the same.

That is, the current aperiodic pulse signal is positioned between periodic pulse signals, in which case the distance between the periodic pulse signals corresponds to a time for which the shaft 3 rotates once. Therefore, when the time is converted into an angle of 360°, it is determined that the aperiodic pulse signal is generated at a position of the shaft 3 corresponding to an angle of, for example, about 180°.

The display unit 400 is operated to display the position of the rotor 2 in which an aperiodic pulse signal is generated, based on the information calculated by the control unit 300. By way of example, the display unit 400 of the embodiment may be configured of a plurality of light emitting devices which are circumferentially arranged at regular intervals on the outer periphery of the front end of the rotor 2.

The display unit 400 is preferably located at the front end of the rotor 2 in order for the operator to easily check the display unit 400 with the naked eye. When it is difficult to install the display unit 400 at the above position, the display unit 400 may be installed at another position.

In this embodiment, when the light emitting device, which is located at a position of the shaft corresponding to an angle of about 180° in which the aperiodic pulse signal is generated, is turned on, the operator may easily check that abnormal vibration occurs at a current position.

Each of the light emitting devices may be selectively one of a lamp and an LED, but the present disclosure is not limited thereto.

The display unit 400 may be configured of a plurality of light emitting devices which are axially arranged at regular intervals on the outer periphery of the rotor 2. In this case, when the aperiodic pulse signal is generated at a specific position in the axial direction of the shaft 3, the operator may rapidly and exactly check and inspect the occurrence position of abnormal vibration.

The control unit 300 may classify an aperiodic pulse signal into three categories, such as safety, inspection, and danger, or more through the leveling of the aperiodic pulse signal, and the operator may recognize these categories. In this case, the display unit 400 may display the position of the rotor such that colors are changed depending on the respective states of the rotor.

For example, in one embodiment, the light emitting device is lit green when the rotor is in a normal state, and the light emitting device is lit red when the rotor is in an abnormal state. Thus, the operator or the manager may exactly and visually recognize the current state of the rotor.

In addition, when the leveling is in a dangerous state, it is possible to sound a warning by operating a separate alarm (not shown). Through such a configuration, it is possible to warn the operator of the current state of the rotor, and to cope with a dangerous state.

Referring to FIG. 5, the display unit 400 may be disposed in the state in which the shaft 3 is illustrated in the drawing when the rotor is viewed from the top. In this case, the display unit 400 may be installed in the front or rear end of the shaft 3 in the axial direction thereof. Alternatively, the display unit 400 may be installed in the middle of the shaft 3 in the axial direction thereof.

When abnormal vibration occurs at a specific position in the axial direction of the shaft 3, the operator or manager may exactly check the position.

The above-mentioned LED may be used as the display unit 400, and a display window 402 may be separately provided in order to display a current time, an interval, and an intensity in which the aperiodic pulse signal is generated. Since the generation time of the aperiodic pulse signal is displayed on the display window 402, the operator may identify an exact time.

In addition, since the interval and intensity of the aperiodic pulse signal are displayed on the display window 402, the operator may exactly determine the current state of the rotor 2 through information on vibration of the rotor 2 when data is accumulated.

Hereinafter, a method of diagnosing abnormal operation of a rotor according to another embodiment of the present disclosure will be described with reference to the drawing.

Figure 6:
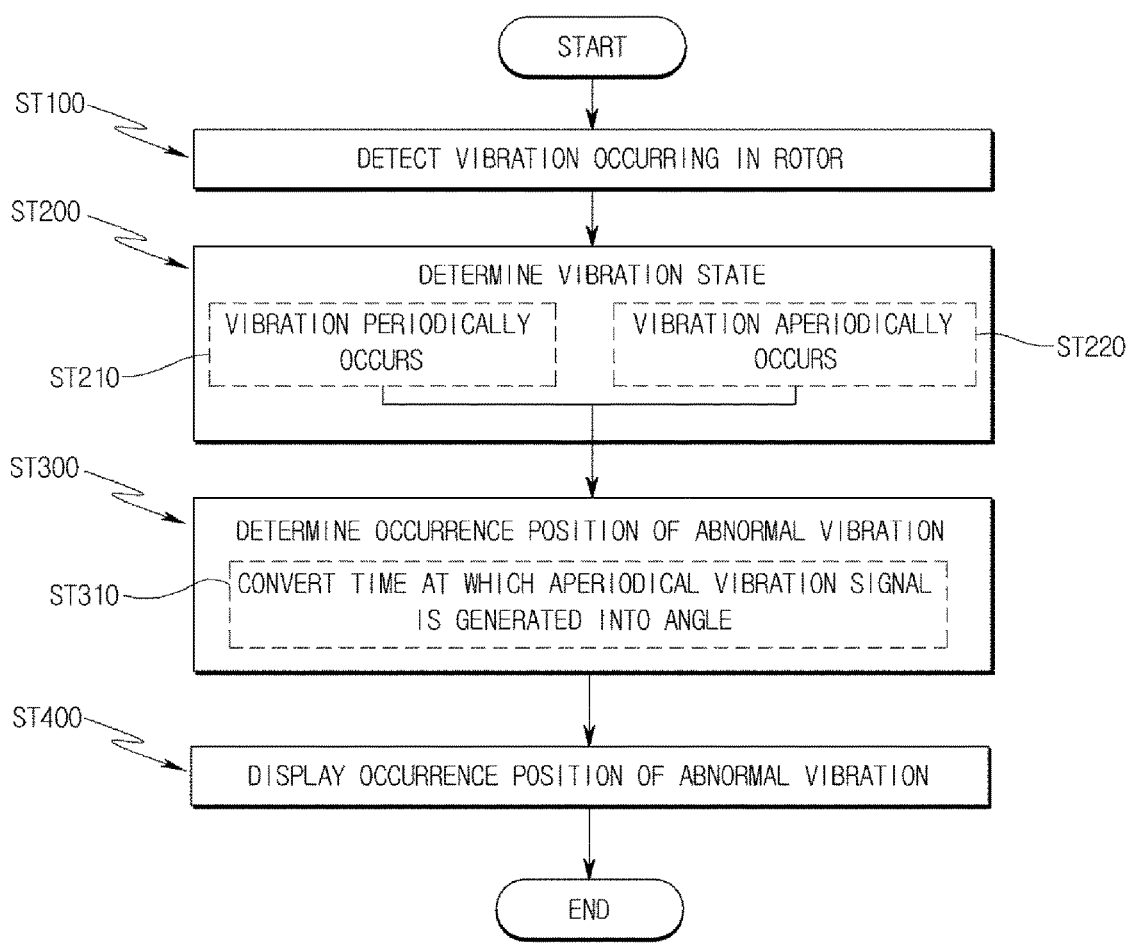
FIG. 6 is a flowchart illustrating a method of diagnosing abnormal operation of a rotor according to another exemplary embodiment of the present disclosure.

Referring to FIG. 6, the method of diagnosing abnormal operation of a rotor according to an exemplary embodiment of the present disclosure includes a step (ST100) of detecting vibration occurring in a rotor having a shaft, a vibration state determination step (ST200) of determining whether the detected vibration occurs in a normal state or in an abnormal state, a step (ST300) of, when the vibration occurring in the rotor is determined to be abnormal vibration in the abnormal state, determining a position at which the abnormal vibration occurs, and a step (ST400) of displaying the occurrence position of the abnormal vibration.

The step (ST100) simultaneously detects periodic vibration which repeatedly occurs while the shaft provided in the rotor rotates once, and aeperiodic vibration which non-repetitively occurs while the shaft rotates once. In this case, a control unit receives signals detected by first and second sensors which are installed to detect the vibration of the rotor.

The first sensor is a vibration sensor, and the second sensor is a tachometer sensor. Thus, the periodicity of vibration occurring whenever the shaft rotates once is detected by the vibration sensor, and a pulse signal having a specific period, which is generated whenever the shaft rotates once, is detected by the tachometer sensor. As a result, the current vibration of the rotor is detected in real time.

Here, the aperiodic vibration may occur once or many times while the shaft rotates once, but is not limited to the number of times. In particular, since the aperiodic vibration irregularly occurs unlike the periodic vibration which normally occurs, the aperiodic vibration is determined together with the periodic vibration.

In step ST200, whether the detected vibration occurs in a normal state or in an abnormal state is determined. For example, when vibration periodically occurs while the shaft axially rotates, the vibration is determined to occur in a normal state (ST210). When vibration aperiodically occurs while the shaft axially rotates, the vibration is determined to occur in an abnormal state (ST220).

When the vibration occurs in the normal state (ST210), the vibration involves periodicity according to the rotation of the shaft. When the vibration occurs in the abnormal state (ST220), the vibration aperiodically occurs at a position, in which the abnormality of the rotor occurs, while involving periodicity according to the rotation of the shaft. Therefore, the vibration state is determined based on the above information.

If a plurality of cracks occur in the shaft, the aperiodic vibration may occur in many positions rather than one position. In this case, the operator may rapidly determine whether or not to operate the rotor, thereby preventing an expensive rotor from being damaged.

Particularly, the determination of periodic and aperiodic vibration may be subdivided in various modes. For example, when the periodic vibration is detected once or many times, the periodic vibration may not be repetitively detected. Therefore, the periodic vibration is determined to be aperiodic noise.

In the vibration state determination step, when vibration periodically occurs once or many times, but is not periodically repeated while the shaft axially rotates, the vibration is determined to occur in a normal state.

For example, when vibration non-repetitively occurs once or twice, periodicity is not maintained. Therefore, it may be determined that the shaft normally rotates.

In the vibration state determination step, the vibration may be determined to originate from the rotation of the shaft, or from an external source outside of the rotor. For example, since the operation of the rotor is not affected by the vibration which is aperiodically transferred from an external source, it may be determined that the vibration is irrelevant to whether or not vibration occurs in the rotor.

In the determination of periodic and aperiodic noise, when particular noise is not additionally detected compared to normal noise occurring depending on the normal rotation of the shaft, the noise is determined to be normal noise.

In order to determine the occurrence position of abnormal vibration (ST300), the position of the rotor in which abnormal vibration occurs is determined by converting a time, at which the aperiodic vibration signal detected between periodic vibration signals generated over time while the shaft rotates is generated, into an angle (ST310).

When the shaft rotates at a certain speed, a predetermined time is required whenever the shaft rotates once. Accordingly, the angle of rotation of the shaft over time is calculated by converting the time into an angle of 360°. For example, the angle of rotation of the shaft when the time is 0.1 S differs from the angle of rotation of the shaft when the time is 0.8 S. Accordingly, when an angle is calculated over each time, it is possible to easily determine the position of the shaft in which the aperiodic vibration signal is generated at a specific angle.

In order to display the occurrence position of abnormal vibration (ST400), when the rotor has a cylindrical shape that extends by a predetermined length in the axial direction of the shaft, the occurrence position of abnormal vibration may be displayed by turning on one light emitting device, corresponding to the occurrence position of aperiodic vibration, among a plurality of light emitting devices which are circumferentially arranged at regular intervals on the front end of the rotor.

As described above, the light emitting device located at the position of the shaft in which abnormal vibration occurs is turned on by calculating an angle over time. In this case, the operator may exactly check the above position with the naked eye, and thus it is possible to improve accuracy.

In this case, the operator may inspect the rotor by exactly establishing a maintenance management plan before the state of the rotor is deteriorated. In this case, it is possible to previously establish the exact stop period of the rotor, and to stably operate an expensive rotor.

As is apparent from the above description, the exemplary embodiments of the present disclosure can exactly distinguish and check periodic vibration signals and aperiodic vibration signals depending on the rotation of a shaft included in a rotor. Thus, it is possible to prevent damage to the rotor and exactly predict the inspection period thereof.

The exemplary embodiments of the present disclosure can determine whether or not the shaft is operated in a normal state by a simple configuration without using expensive devices. Thus, it is possible to improve an operator's efficiency.

When an aperiodic vibration signal is detected at the specific position of the shaft, it is possible to exactly display the above position. Thus, since a time required to detect the occurrence position of vibration is significantly reduced, the operator can immediately cope with the situation after checking the position.

While the present disclosure has been described with respect to the specific embodiments, it will be apparent to those skilled in the art that various changes and modifications may be made without departing from the spirit and scope of the disclosure as defined in the following claims.

What is claimed is:

1. An apparatus for diagnosing abnormal operation of a rotor having a shaft configured to be axially rotated, the apparatus comprising:
a display circumferentially arranged at regular intervals around the rotor and configured to display a rotor status at any of a plurality of angular positions of the rotor with respect to a specific axial position of the shaft;
a first sensor provided in a bearing mount supporting the shaft at the specific axial position to detect vibration occurring in the rotor at the specific axial position while the shaft axially rotates and to generate a vibration signal indicative of rotor acceleration over time;
a second sensor installed at a location radially relative to the specific position of the first sensor to generate a periodic pulse signal over time, the generated periodic pulse signal including a periodic pulse for each rotation of the shaft; and
a controller configured to
determine the detected vibration to be an abnormal vibration when the vibration signal includes an aperiodic pulse signal, and
control the display to display the rotor status at an angular position among the plurality of angular positions based on a timing of the abnormal vibration with respect to the periodic pulse signal.

2. The apparatus according to claim 1, wherein the first sensor includes a vibration sensor, and the second sensor includes a tachometer sensor.

3. The apparatus according to claim 2, wherein the second sensor comprises:

a main body having a light emitting part to irradiate the shaft with a laser;
a reflector rotating together with the shaft and reflecting the laser emitted from the light emitting part back to the main body; and
a light receiving part provided on the main body that receives the laser reflected from the reflector.

4. The apparatus according to claim 2, wherein the second sensor is selectively installed at a position radially separated from the specific position of the first sensor by a predetermined angle.

5. The apparatus according to claim 1, wherein the first sensor is located outside the shaft so as not to interfere with the axial rotation of the shaft.

6. The apparatus according to claim 1, wherein the display comprises a plurality of light emitting devices circumferentially arranged at regular intervals on an outer periphery of the rotor.

7. The apparatus according to claim 1, wherein the first sensor consists of a plurality of first sensors respectively disposed at a plurality of axial positions of the shaft to detect vibration occurring at each axial position while the shaft axially rotates, and the display consists of a plurality of displays axially arranged at regular intervals corresponding to the plurality of axial positions of the shaft.

8. The apparatus according to claim 1, wherein a time, an interval, and an intensity in which the aperiodic pulse signal is generated are displayed on the display.

9. The apparatus according to claim 1, wherein the controller is further configured to classify the aperiodic pulse signal included in the vibration signal and to assign an inspection period of the rotor based on the classification, and the display includes a different display for each classification.

10. The apparatus according to claim 9, wherein the aperiodic pulse signal is classified according to intensity of the received aperiodic pulse signal, and each of the different displays is configured to display the rotor status according to the assigned inspection period as one of safe, inspection, and danger.

11. A method of diagnosing abnormal operation of a rotor having a shaft configured to be axially rotated, the method comprising:
axially supporting the shaft at a specific axial position;
generating a vibration signal indicative of rotor acceleration over time by detecting vibration occurring in the rotor at the specific axial position while the shaft axially rotates;
generating a periodic pulse signal over time, the generated periodic pulse signal including a periodic pulse for each rotation of the shaft;
determining the detected vibration to be an abnormal vibration when the vibration signal includes an aperiodic pulse signal, and
displaying a status of the rotor at an angular position of the rotor based on a timing of the abnormal vibration with respect to the periodic pulse signal in order to indicate the angular position by turning on one light emitting device among a plurality of light emitting devices circumferentially arranged at regular intervals around the rotor.

12. The method according to claim 11, wherein the detecting vibration comprises simultaneously detecting periodic vibration and aperiodic vibration, the periodic vibration being vibration which repeatedly occurs while the shaft axially rotates, and the aperiodic vibration being vibration which occurs non-repetitively while the shaft axially rotates.

13. The method according to claim 11, further comprising:
determining whether the detected vibration occurs in a normal state of the rotor or an abnormal state of the rotor,
wherein the vibration is determined to occur in the normal state when vibration periodically occurs while the shaft axially rotates, and the vibration is determined to occur in the abnormal state when vibration aperiodically occurs while the shaft axially rotates.

14. The method according to claim 13, wherein the detected vibration is determined to occur in the normal state when vibration non-repetitively occurs and is not periodically repeated while the shaft axially rotates.

15. The method according to claim 13, wherein determining whether the detected vibration occurs in a normal state or in an abnormal state comprises determining whether the vibration originates from rotation of the shaft, or whether the vibration originates from an external source.

16. The method according to claim 11, further comprising:
determining a time of aperiodic vibration by detecting an aperiodic vibration signal between periodic vibration signals generated over time while the shaft axially rotates; and
determining a position at which the abnormal vibration occurs by converting the time of aperiodic vibration into an angle.

17. The method according to claim 11,
wherein the rotor has a cylindrical shape that extends by a predetermined length in an axial direction of the shaft, and
wherein the turned-on light emitting device corresponds to an occurrence position of aperiodic vibration along the predetermined length.

18. An apparatus for diagnosing abnormal operation of a rotor having a shaft configured to be axially rotated, the apparatus comprising:
a first sensor provided in a bearing mount supporting the shaft at a specific axial position along the shaft to detect vibration occurring in the rotor at the specific axial position of the bearing mount while the shaft axially rotates and to generate a vibration signal indicative of rotor acceleration over time;
a second sensor installed at a location radially relative to the specific position of the first sensor to generate a periodic pulse signal over time, the generated periodic pulse signal including a periodic pulse for each rotation of the shaft;
a display circumferentially arranged at regular intervals around the rotor in order to display a rotor status at any of a plurality of angular positions of the rotor with respect to the specific axial position of the shaft; and
a controller configured to
determine an operation state of the rotor based on the respectively generated signals, the operation state determined to be a normal state when the detected vibration periodically occurs while the shaft axially rotates and determined to be an abnormal state when the detected vibration is determined to be an instance of aperiodic vibration by detecting an aperiodic vibration signal between periodic vibration signals generated over time while the shaft axially rotates,
determine a time of the aperiodic vibration with respect to the periodic pulse signal, and
determine a position at which the aperiodic vibration occurs by converting the time of the aperiodic vibration into a radial angle of the rotor with respect to the shaft, the radial angle corresponding to one of the plurality of angular positions of the rotor.

19. The apparatus according to claim 18,
wherein the controller is further configured to control the display to display the rotor status at an angular position among the plurality of angular positions based on the radial angle.

20. The apparatus according to claim 19, wherein the first sensor consists of a plurality of first sensors respectively disposed at a plurality of axial positions of the shaft to detect vibration occurring at each axial position while the shaft axially rotates, and the display consists of a plurality of displays axially arranged at regular intervals corresponding to the plurality of axial positions of the shaft.

* * * * *